(12) United States Patent
Simionescu et al.

(10) Patent No.: US 9,158,695 B2
(45) Date of Patent: Oct. 13, 2015

(54) SYSTEM FOR DYNAMICALLY ADAPTIVE CACHING

(75) Inventors: Horia Simionescu, Foster City, CA (US); Mark Ish, Atlanta, GA (US); Luca Bert, Cumming, GA (US); Robert Quinn, Campbell, CA (US); Earl T. Cohen, Oakland, CA (US); Timothy Canepa, Los Gatos, CA (US)

(73) Assignee: Seagate Technology LLC, Cupertino, CA (US)

( * ) Notice: Subject to any disclaimer, the term of this patent is extended or adjusted under 35 U.S.C. 154(b) by 210 days.

(21) Appl. No.: 13/566,204

(22) Filed: Aug. 3, 2012

(65) Prior Publication Data

US 2013/0042064 A1 Feb. 14, 2013

Related U.S. Application Data

(60) Provisional application No. 61/521,739, filed on Aug. 9, 2011, provisional application No. 61/531,551, filed on Sep. 6, 2011, provisional application No. 61/543,666, filed on Oct. 5, 2011, provisional application No. 61/614,545, filed on Mar. 23, 2012, provisional application No. 61/614,548, filed on Mar. 23, 2012.

(51) Int. Cl.
*G06F 12/00* (2006.01)
*G06F 12/08* (2006.01)

(52) U.S. Cl.
CPC ...... *G06F 12/0871* (2013.01); *G06F 2212/401* (2013.01)

(58) Field of Classification Search
USPC .......................... 711/118, 170–172, E12.017
See application file for complete search history.

(56) References Cited

U.S. PATENT DOCUMENTS

| 6,968,424 | B1 | 11/2005 | Danilak |
| 7,979,655 | B2 | 7/2011 | Edwards et al. |
| 2005/0132161 | A1 | 6/2005 | Makela et al. |
| 2006/0047916 | A1 | 3/2006 | Ying et al. |
| 2012/0072641 | A1* | 3/2012 | Suzuki et al. ................ 711/103 |

FOREIGN PATENT DOCUMENTS

WO 2007135602 A1 11/2007

OTHER PUBLICATIONS

Makatos, Thanos, et al., "Using Transparent Compression to Improve SSD-based I/O Caches", EuroSys '10, Apr. 13-16, ACM 978-1-60558-577-2/10/04, Apr. 2010, 14 pages.

* cited by examiner

*Primary Examiner* — Jasmine Song
(74) *Attorney, Agent, or Firm* — Suiter Swantz pc llo

(57) ABSTRACT

The present disclosure is directed to a system for dynamically adaptive caching. The system includes a storage device having a physical capacity for storing data received from a host. The system may also include a control module for receiving data from the host and compressing the data to a compressed data size. Alternatively, the data may also be compressed by the storage device. The control module may be configured for determining an amount of available space on the storage device and also determining a reclaimed space, the reclaimed space being according to a difference between the size of the data received from the host and the compressed data size. The system may also include an interface module for presenting a logical capacity to the host. The logical capacity has a variable size and may include at least a portion of the reclaimed space.

20 Claims, 7 Drawing Sheets

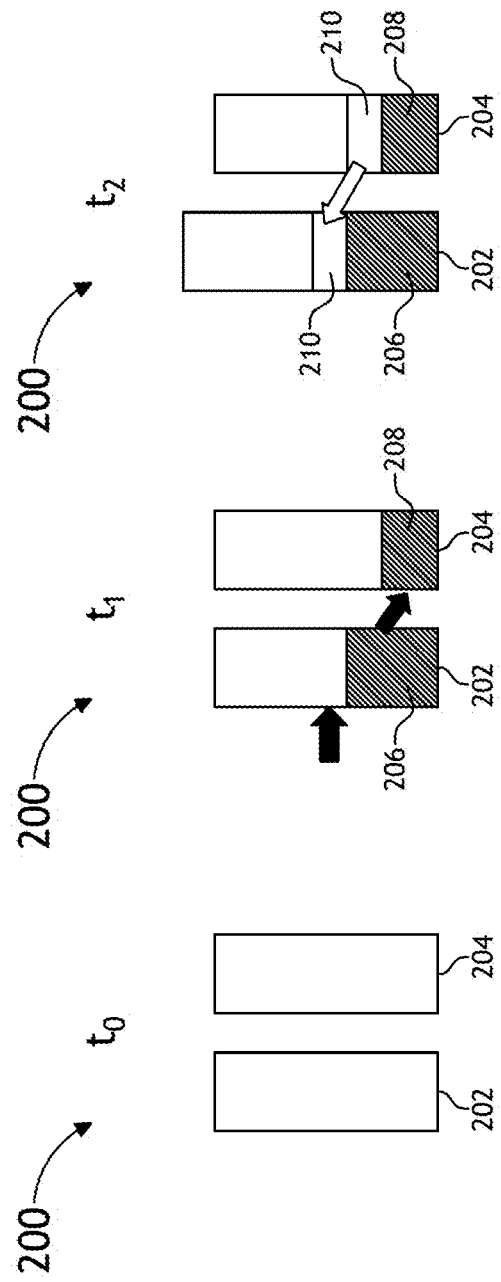

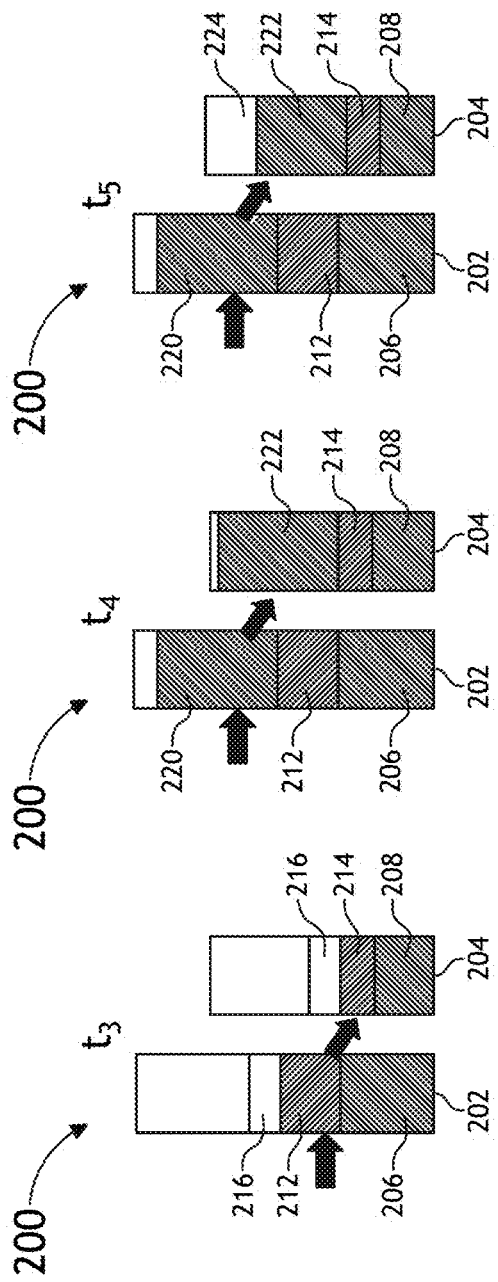

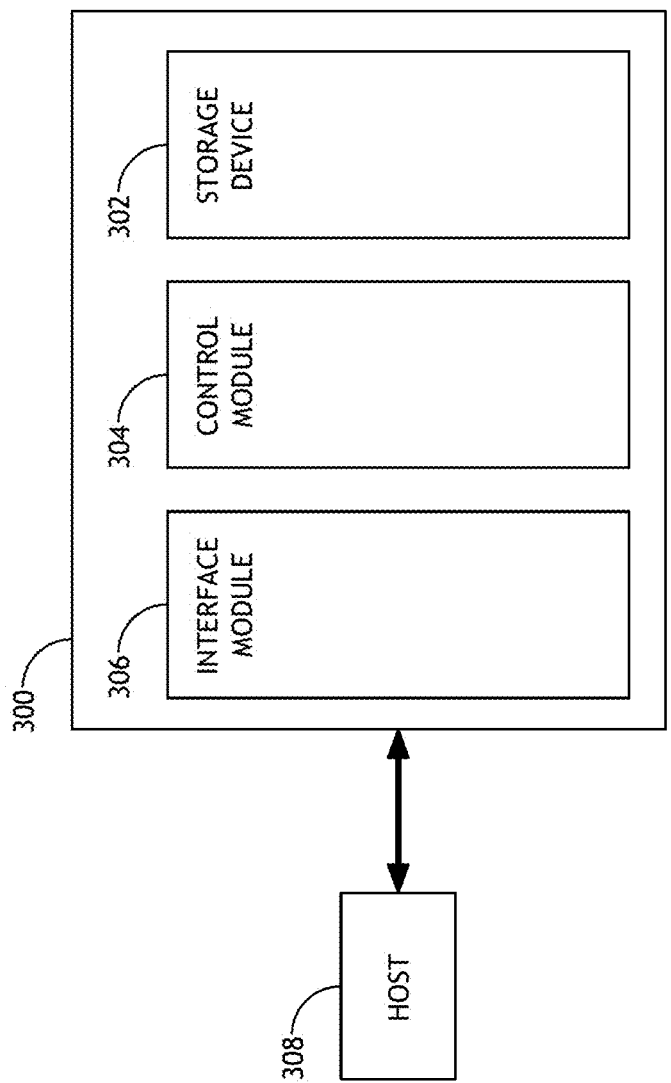

SYSTEM FOR DYNAMICALLY ADAPTIVE CACHING

CROSS-REFERENCE TO RELATED APPLICATIONS

The present application claims the benefit under 35 U.S.C. §119(e) of U.S. Provisional Application Ser. No. 61/521,739 filed Aug. 9, 2011, U.S. Provisional Application Ser. No. 61/531,551 filed Sep. 6, 2011, U.S. Provisional Application Ser. No. 61/543,666 filed Oct. 5, 2011, U.S. Provisional Application Ser. No. 61/614,545, filed Mar. 23, 2012 and U.S. Provisional Application Ser. No. 61/614,548 filed Mar. 23, 2012. Said U.S. Provisional Application Ser. No. 61/521,739, No. 61/531,551, No. 61/543,666, No. 61/614,545, and No. 61/614,548 are hereby incorporated by reference in their entirety.

TECHNICAL FIELD

The present disclosure generally relates to the field of caching, and more particularly to system for dynamically adaptive caching and method of managing a dynamically adaptive cache.

BACKGROUND

Caching is known to help increase the performance of storage systems by transparently storing data so that future requests for that data can be served faster. The larger the usable cache size, the better performance that the cache can deliver to the overall system. A storage system cache comprises two portions: a data portion storing data that is read or written by a host, such as a server, and a tag portion used to identify and/or locate a subset of a larger amount of data accessible by the host that is stored in the cache. Generally, the larger the data portion the higher the fraction of the host accesses that "hit" in the cache, and the higher the performance of the storage system.

Data compression may be used in order to reduce the total storage space or transmission time required for a given size of data. However, the compressibility of data is variable and depends on the level of data entropy. This variability in the compressibility of data results in a need for data storage spaces of varying size.

In storage system caching, it is often necessary to present a fixed and stable cache size to the upper layers of the system. Therefore, space which may be gained by compression of data on a storage device may not be utilized by the cache due to the variable nature of the compressibility of the data and its corresponding size.

Therefore, there exists a need for improved methods and systems for storage system caching when data may vary in size due to compression of the data.

SUMMARY

A method for managing a dynamically adaptive cache is provided. The method includes the steps of receiving data from a host and compressing the received data to a compressed data size. The compressed data is then stored and the amount of available space remaining is determined. A further step of the method involves increasing the logical capacity presented to the host by an amount according to at least a portion of a difference between the size of the received data and the size of the compressed data when the amount of available space is greater than a configuration threshold.

The present disclosure is also directed to a system for dynamically adaptive caching. The system includes a storage device having a physical capacity for storing data received from a host. The system may also include a control module communicatively coupled to the storage device and configured for receiving data from the host. The control module is configured for compressing the data received from the host to a compressed data size. In an alternative embodiment, the data may be compressed on the storage device. The control module may also be configured for determining an amount of available space on the storage device. The control module may also be configured for determining a reclaimed space, the reclaimed space being according to a difference between the size of the data received from the host and the compressed data size. The system may also include an interface module configured for presenting a logical capacity to the host. The logical capacity has a variable size and optionally and/or selectively includes at least a portion of the reclaimed space.

The present disclosure is also directed to a method for managing a cache. The method includes the steps of receiving data from a host and compressing the data to a compressed data size. The compressed data is then stored and an amount of available space is determined. Next, at least a portion of a difference between the size of the received data and the size of the compressed data is optionally and/or selectively presented to the host, such as when the amount of available space is greater than a configuration threshold.

The present disclosure is also directed to a method including the step of receiving, by a storage device over a storage interface, a plurality of data portions. The next step of the method requires reducing each of the data portions to form respective reduced data portions, at least some of the data portions having a larger size than the respective reduced data portions. The method also includes the step of storing the data portions as the reduced data portions in a data memory of the storage device. The data memory may be non-volatile data memory. The final step of the method is determining a logical capacity of the data memory according to a utilization of the data memory. In this method, the logical capacity of the data memory varies according to the reducing of the data portions.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIGS. 2A through 2F show a dynamically adaptive cache at several different time intervals in accordance with the present disclosure;

FIG. 3 shows a dynamically adaptive cache in accordance with the present disclosure;

DETAILED DESCRIPTION

Reference will now be made in detail to the subject matter disclosed, which is illustrated in the accompanying drawings.

In some embodiments, a data portion of a dynamically adaptive storage system cache is stored in a storage device, such as storage device 302 in FIG. 3. The storage device maps a logical address space having a defined maximum logical capacity to physical storage devices, such as NAND flash chips, having a defined physical size. A portion of the maximum logical capacity is presented and/or made available to higher layers, such as the higher layers managing the storage system cache, the portion varying at least in part based on utilization of the physical storage devices. The utilization of the physical storage devices varies in turn based at least in part on reducibility, such as via compression, of data stored in the physical storage devices. An amount of data enabled to be stored in the dynamically adaptive storage system cache in turn varies, at least in part, according to the portion of the maximum logical capacity presented and/or made available to the higher layers managing the storage system cache. Thus when storing more reducible (e.g., more compressible) data, the dynamically adaptive storage system cache is advantageously enabled to present and/or make available a greater portion of the maximum logical capacity, and is thus able to store more data and deliver higher performance. According to various embodiments, the higher layers comprise one or more of: the storage device; a control module, such as control module 304 of FIG. 3; and a host, such as host 306 of FIG. 3. For example, in some embodiments, the control module manages tags (and thus the data content) of the dynamically adaptive storage system cache, while in other embodiments, the host manages tags of the dynamically adaptive storage system cache.

Figure 1A:
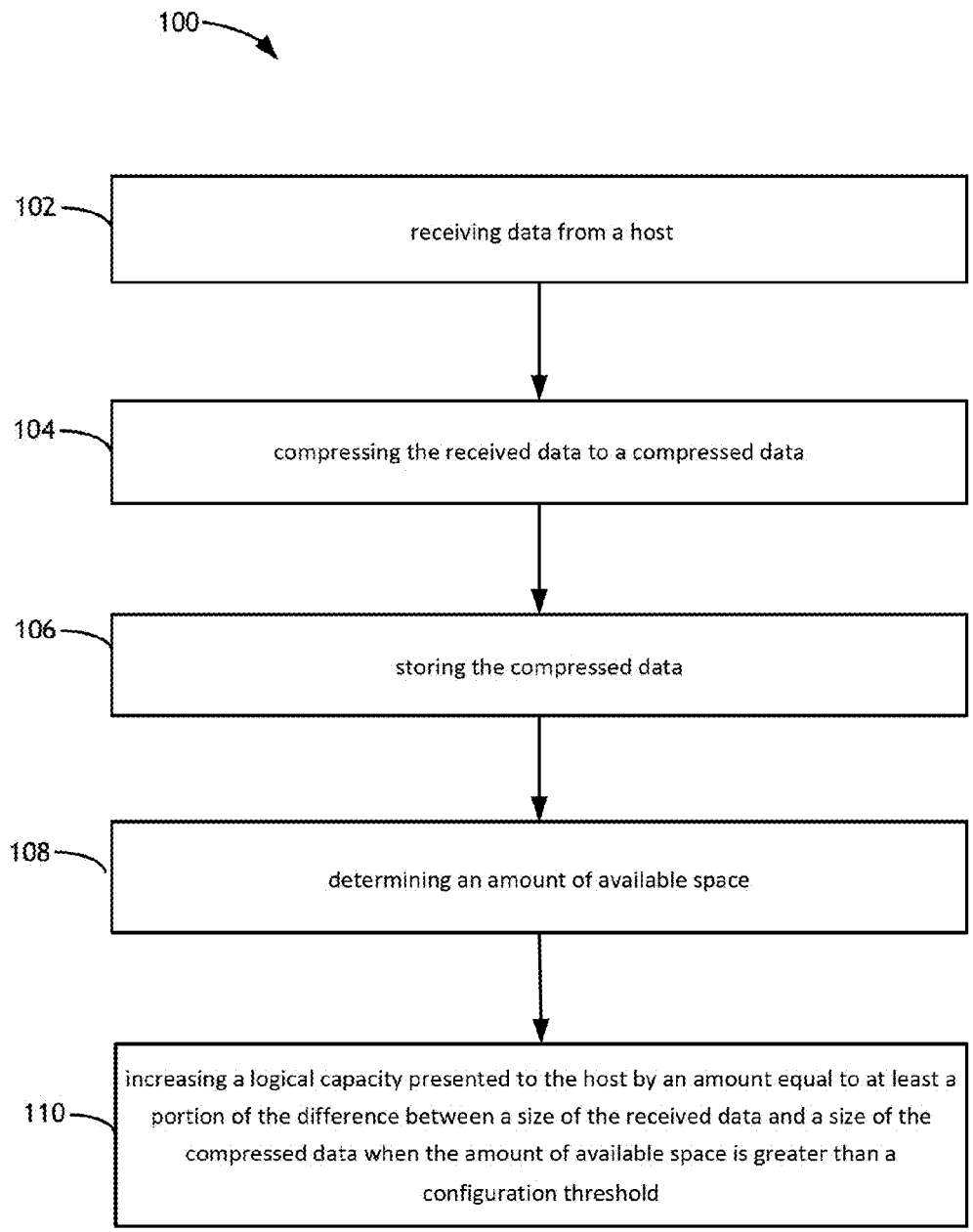
FIG. 1A is a flow diagram of a method for managing a dynamically adaptive cache in accordance with the present disclosure.

Referring generally to FIG. 1A, a method 100 for managing a dynamically adaptive cache is shown. The dynamically adaptive cache presents a variable cache size to a host, and is optionally and/or selectively enabled to present a larger logical size to the host than the physical size of the storage device included with the dynamically adaptive cache. The method 100 includes the step of receiving data from a host to the dynamically adaptive cache 102 and compressing (or otherwise reducing in size) the data received from the host to a compressed data 104. The compressed data is stored on the storage device 106. Next, the method 100 involves the step of determining an amount of available space on the storage device 108. A further step of the method 100 requires increasing the logical capacity of the dynamically adaptive cache as presented to the host by an amount according to at least a portion of a difference between the size of the data received from the host and the size of the data after compression when the amount of available space on the storage device is greater than a configuration threshold 110. According to various embodiments, the logical capacity presented to the host is one or more of: increased by an amount equal to a portion of the difference; increased by an amount proportional to a portion of the difference; increased by an amount that is at least a portion of the difference; computed via a function of the difference and other factors; and computed via a function of the amount of available space, the physical size, and other factors. The method 100 may be performed each time that data is received from the host and/or periodically, resulting in a dynamically adaptive cache that changes size depending on the compressibility of the data. For example, the method 100 may be performed at a regular interval, for every one or more host commands, for every one or more host commands of a specified type such as write commands, and/or when the amount of available space changes by a specified amount.

The step of compressing the data received from the host to a compressed data 104 may occur on the storage device using a suitable module or hardware for executing the compression (or other techniques for reducing in size). It would also be possible to complete the step of compressing the data received from the host to a compressed data 104 on the control module prior to storing the compressed data on the storage device.

The step of determining the amount of available space on the storage device 108 of the method 100 shown in FIG. 1A may be executed in a variety of ways. In instances where the step of compressing the data 104 is executed on the control module, the step of determining the amount of available space on the storage device 108 may be simplified, as the control module may automatically determine the size of the data received and the size of the data after compression, and easily determine the amount of available space remaining on the storage device based on this information.

If the step of compressing the data received from the host to a compressed data 104 occurs on the storage device, then the step of determining the amount of available space on the storage device 108 may be executed using a synchronous model. Under the synchronous model, the storage device sends a signal, such as an interrupt, to the control module of the dynamically adaptive cache when the amount of space available on the storage device exceeds the configuration threshold. The control module will then query the storage device to read the amount of available space through a defined command, such as a read buffer or other command. In an alternative embodiment, the available space is determined using an asynchronous model. Under the asynchronous model, the control module will dynamically query the storage device to determine the available space at a given time, and continue to query the storage device periodically to determine whether the available space exceeds the configuration threshold.

The method 100 may also include the step of releasing space on the storage device when the amount of available space is less than a reserve amount. This may be accomplished by one or more of decommissioning some of the entries of the cache such as clean entries, issuing a TRIM request to the storage device, invalidating one or more entries of a tag memory of the cache, and other means. The purpose of this step is to ensure that the dynamically adaptive cache is able to guarantee a specified minimum fixed size to the host by reserving an amount of space on the storage device. As the compressibility of data may be variable, a reserve amount of space is preserved on the storage device so that when the dynamically adaptive cache is nearing the maximum capacity, the dynamically adaptive cache can still store the data and/or can still provide a specified level of performance. Due to the requirement to guarantee the specified minimum fixed size to the host and the variable nature of data compression, it may be desirable to set the reserve amount conservatively in order to avoid the risks of filling the storage device and/or reducing performance below the specified level. It is also important to set the reserve amount conservatively because the dynamically adaptive cache may not always be able to immediately implement the step of releasing space on the storage device due to system limitations (for example, because a TRIM command cannot be executed concurrently with a Read/Write command by the storage device, or depending on whether the storage device uses native command queuing).

A further step of the method 100 for managing a dynamically adaptive cache may include sending a signal from the storage device to the control module when the amount of available space on the storage device approaches and/or is less than the reserve amount. The purpose of this step is ensure the control module can timely respond (for example, by releasing space on the storage device) when the storage device is running out of available space.

Figure 1B:
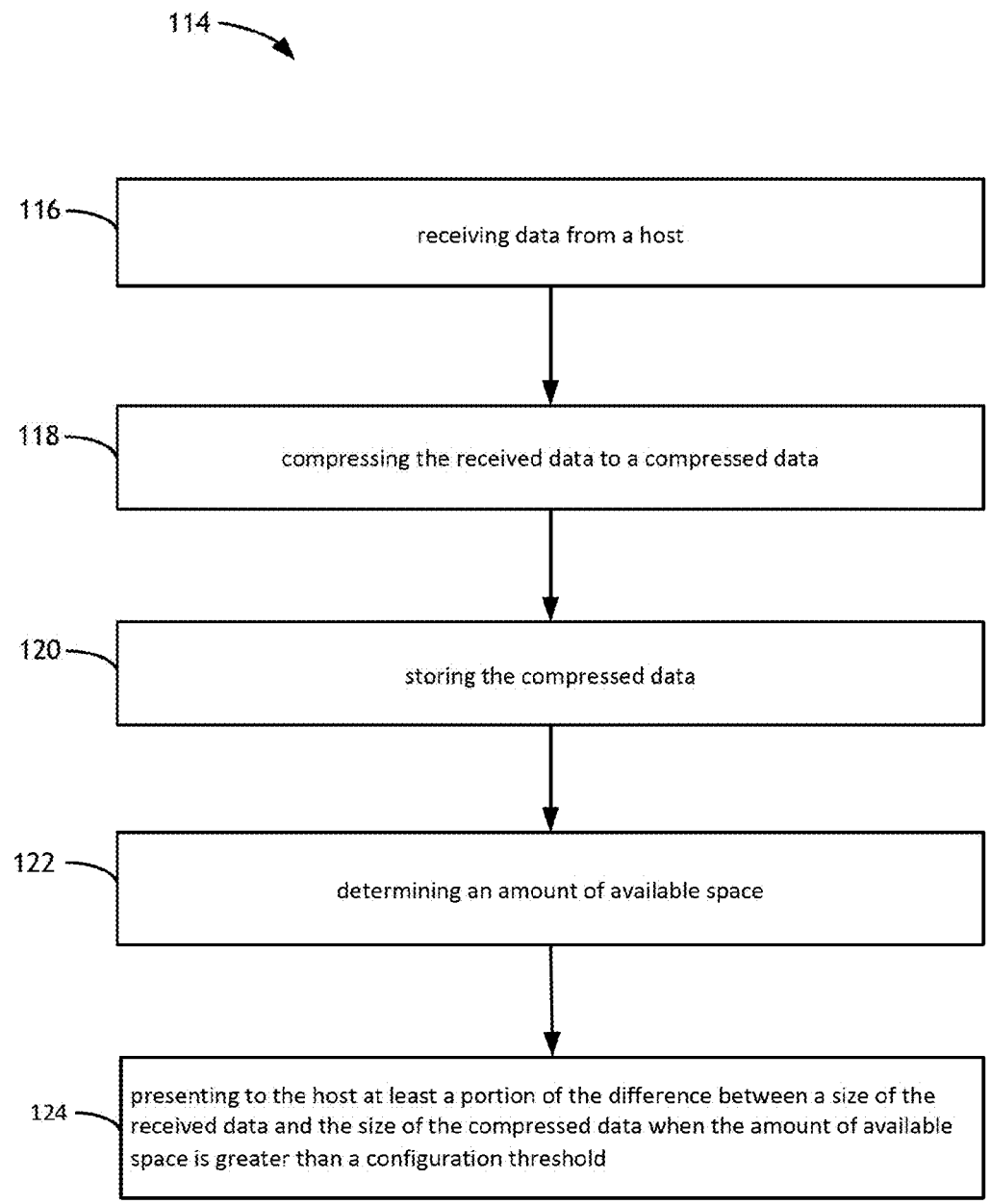
FIG. 1B is a flow diagram of a method for managing a cache in accordance with the present disclosure.

Referring generally to FIG. 1B, a method 114 for managing a dynamically adaptive cache is shown. The method 114 includes the steps of receiving data from a host 116 and compressing (or otherwise reducing in size) the received data to a compressed data 118. The next step of the method is to store the compressed data 120. A further step of the method is to determine an amount of available space 122. The method then includes the step of presenting to the host at least a portion of a difference between the size of the received data and the size of the compressed data. According to various embodiments, the presenting to the host is performed one or more of: when the amount of available space is greater than a configuration threshold 124; periodically in time; periodically in a number of commands received from the host; and on request from the host.

The method shown in FIG. 1B may also include the step of releasing space on the storage device when the amount of available space is less than a reserve amount. The method may also include the step of sending a signal when the amount of available space approaches and/or is less than a reserve amount, and possibly sending a query to determine the amount of available space. The method 114 may be performed each time data is received from the host.

Referring generally to FIGS. 2A through 2F, an example of a dynamically adaptive cache 200 is shown. FIG. 2A shows a dynamically adaptive cache 200 including a logical space 202 and a physical storage space 204 at an initial time interval, $t_0$. The logical space 202 is the storage space as presented to the host, and the size of the logical space 202 varies over time. As shown in FIG. 2A, at the initial time interval ($t_0$), no data has been received from the host, and both the logical space 202 and the physical storage space 204 of the dynamically adaptive cache 200 are empty. While logical space 202 is illustrated adjacent to physical storage space 204 in FIGS. 2A to 2F, there is no implication that relative sizes of logical space 202 and physical storage space 204 are related. According to various embodiments, logical space 202 is one or more of: able to store less data than physical storage space 204; able to store a same amount of incompressible data as physical storage space 204; able to store more data than physical storage space 204 could store if the data was incompressible; always less than a specified maximum size; and always greater than a specified minimum size.

FIG. 2B shows the dynamically adaptive cache 200 at a first time interval, $t_1$, after data has been received from the host to the dynamically adaptive cache 200. The data is uncompressed and requires an uncompressed data space 206 on the logical space 202. The data is compressed to a compressed data space 208 and stored on to the physical storage space 204. The size of the data after compression (the compressed data space 208) is generally smaller than the size of the data before compression (the uncompressed data space 206), although this depends on the compressibility of the data.

FIG. 2C shows the dynamically adaptive cache 200 at a time $t_2$. At the time $t_2$, the logical space 202 of the dynamically adaptive cache as presented to the host will increase by an amount according to at least a portion of the space reclaimed as a result of the compression of the data at the time $t_1$. The space gained through the compression is reclaimed space 210 and is equal to a difference between the size of the uncompressed data space 206 and the size of the compressed data space 208. FIG. 2C shows the reclaimed space 210 being added to the logical space 202. The reclaimed space 210 is added to the logical space 202 presented to the host, thus enabling the dynamically adaptive cache 200 to present a larger logical space 202 to the host. In one embodiment, the entire size of the reclaimed space 210 is presented to the host, however, it is also possible to present only a portion of the reclaimed space 210 to the host and to reserve a portion of the reclaimed space 210 on the physical storage space 204.

FIG. 2D shows the dynamically adaptive cache 200 at a time $t_3$, after additional data is received from the host to the logical space 202. The data is uncompressed and occupies a second uncompressed data space 212 on the logical space 202. The data is compressed and stored on the physical storage space 204 as a second compressed data space 214. The size of the second compressed data space 214 is less than the size of the second uncompressed data space 212 when the data is at least partially compressible. The space gained through the compression is referred to as a second reclaimed space 216, and is equal to a difference between the second uncompressed data space 212 and the second compressed data space 214. The effective size of the logical space 202 is increased by an amount according to the size of the second reclaimed space 216, as shown in FIG. 2D. The second reclaimed space 216 is added to the logical space 202, thereby facilitating the presentation of a larger dynamically adaptive cache 200 to the host.

FIG. 2E shows the dynamically adaptive cache 200 at a time $t_4$. At the time $t_4$, additional data is received to the dynamically adaptive cache 200. The data is uncompressed and occupies a third uncompressed data space 220 on the logical space 202, and is compressed and stored to a third compressed space 222 on the physical storage space 204. At this time, the physical storage space 204 is almost full and has nearly reached its maximum capacity. An amount of space is reserved on the physical storage space 204 at all times in order to prevent the physical storage space 204 from becoming full. If the physical storage space 204 starts to become so full that the threshold of the reserve space is reached, then space must be released by the dynamically adaptive cache 200.

FIG. 2F shows the dynamically adaptive cache 200 at a time $t_5$. At the time $t_5$, space has been released to the physical storage space 204 so that the physical storage space 204 is no longer in danger of being completely full. A released space 224 has been returned to the physical storage space 204, so it is no longer approaching its maximum capacity. The released space 224 may have released data, such as by trimming, from one or more of compressed data space 208, second compressed data space 214, and third compressed space 222. The data may also have undergone further compression, resulting in, for example, a smaller third compressed space 222.

FIG. 2F also shows the aggregate of the increase in the logical space 202 as presented to the host, reflecting that the dynamically adaptive cache 200 is capable of presenting a logical space 202 that is able to change, and that in some embodiments is larger than the physical storage space 204. The process shown in FIGS. 2A through 2F may be performed each time data is received from the host, resulting in a dynamically adaptive cache that is dynamically changing in size.

The size of the logical space presented to the host fluctuates depending on the reducibility, such as compressibility, of the data received from the host and the amount of available space. The data may be reduced by a lossless compression algorithm or other data reduction methods suitable for the dynamically adaptive cache. When the data entropy is 100%, the data is not compressible (or otherwise reducible) and the dynamically adaptive cache is unable to reclaim any space and present it to the host by increasing the size of the logical space. When data entropy is less than 100%, the data is compressible, and the dynamically adaptive cache may reclaim the space saved by compression and enlarge the logical space by at least a portion of this amount. As the compressibility of data received from the host may vary, ranging from uncompressible data to highly compressible data, the size of the dynamically adaptive cache changes dynamically according to the data that is received.

Referring generally to FIG. 3, an exemplary system 300 for dynamically adaptive caching in accordance with the present disclosure is shown. The system 300 may be a computing system or device. The system 300 includes a storage device 302, a control module 304, and an interface module 306. The system 300 is used for sending and receiving data from a host 308. The control module 304 is configured to receive data from the host 308, and it may be used to compress the data. Alternatively, the data compression may occur on the storage device 302. In either case, the compressed data is stored to the storage device 302. According to various embodiments, storage device 302 comprises a storage memory to store the received data that is one or more of: a static random access memory, a dynamic random access memory, an embedded memory, a non-volatile memory such as NAND flash memory, a semiconductor memory, and any other type of memory device.

The control module 304 may also be used to determine the amount of space that has been gained by the compression, which can be referred to as the reclaimed space. The reclaimed space is equal to a difference between the size of the data received from the host 308 before compression and the size of the compressed data, summed over the data received from the host and currently stored by the storage device. At least a portion of the reclaimed space may be presented and/or made available to the host 308 using the interface module 306. In some embodiments, the interface module 306 is configured for presenting a logical capacity to the host 308. The size of the logical capacity presented to the host will vary, but may include at least a portion of the reclaimed space as well as the available logical capacity of the storage device 302 at a given time.

The control module 304 of the system 300 shown in FIG. 3 may also be configured to determine the available logical space on the storage device 302. The control module 304 is communicatively coupled with the storage device 302 and capable of receiving signals from the storage device 302. The control module 304 is also configured to query the storage device 302 either upon receipt of a signal from the storage advice, or at a given time interval, or periodically in a number of commands sent to and/or responses received from the storage device.

The storage device 302 of the system 300 shown in FIG. 3 may be a solid-state disk with non-volatile semiconductor memory, such as NAND flash based storage. The storage device 302 may be configured to send a signal to the control module 304 when the amount of available space on the storage device 302 approaches and/or has reached a configuration threshold. The storage device 302 is also configured to maintain a reserve amount of space to ensure the storage device 302 is able to store data from the host 308 and/or is able to provide a specified minimum level of performance at all times. For example, in some embodiments the reserve amount of space is maintained to ensure that write amplification is less than a specified level.

According to various embodiments, the control module 304 of the system 300 shown in FIG. 3 is one or more of: an I/O controller; a Raid-On-Chip (ROC) controller; a host bus adapter; any chip for interfacing a storage device to a host; and any of the foregoing incorporating cache management and/or cache control.

Figure 4A:
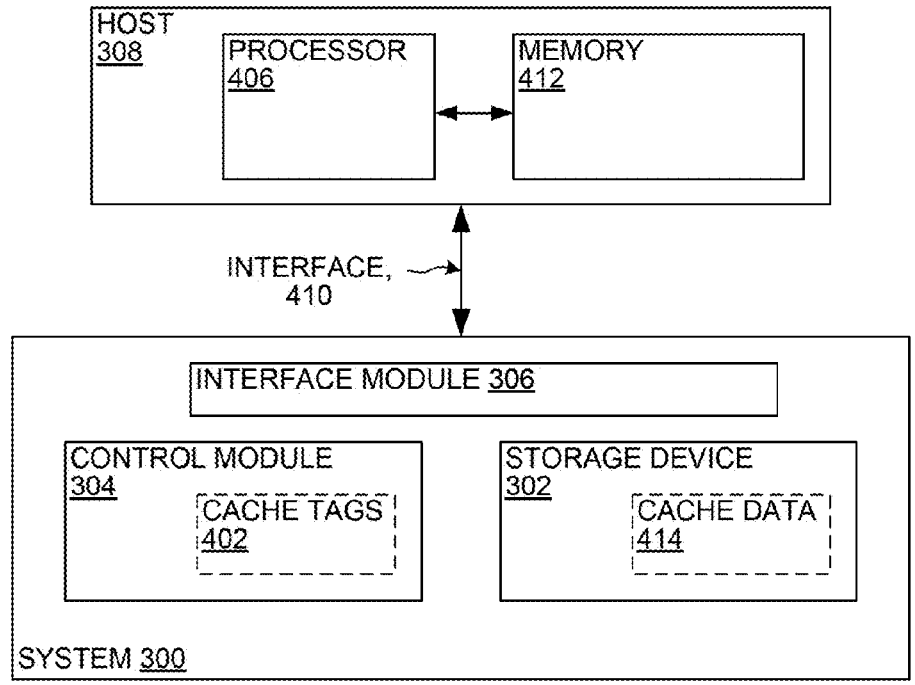
FIGS. 4A and 4B each show a respective system for providing dynamically adaptive caching in accordance with the present disclosure.

Referring to FIG. 4A of the present disclosure, a system 300 for dynamically adaptive caching is provided. The system 300 includes an interface module 306, control module 304, and storage device 302. The control module 304 is managing the cache and cache tags 402 are located in the control module 304. The storage device 302 of the system 300 also includes cache data 414. The system 300 is communicatively coupled to a host 308 via an interface 410. The host 308 includes a processor 406 and a memory 412.

Figure 4B:
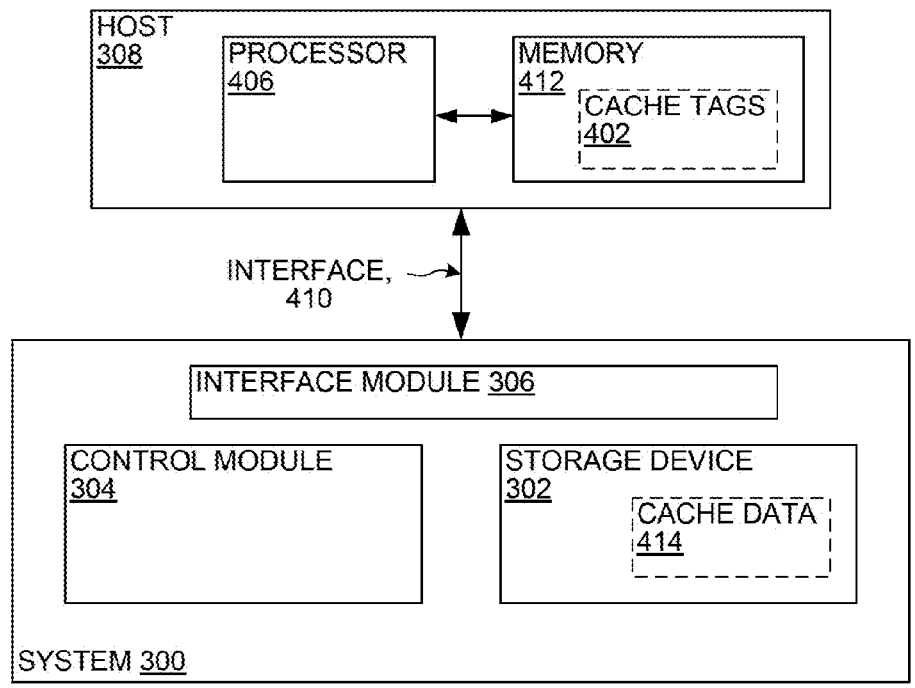

In FIG. 4B of the present disclosure, a system 300 for dynamically adaptive caching is provided, showing the configuration when the host 308 is managing the cache. In FIG. 4B, the system 300 includes cache data 414 in the storage device 302 of the system 300. The host 308 includes cache tags 402 in the memory 412 of the host 308.

The memory 412 of the host 308 may be any system and/or device capable of storing data. In one embodiment, memory 412 stores computer code that, when executed by processor 406 causes processor 406 to perform a method for managing a dynamically adaptive cache.

The system 300 shown in FIGS. 4A and 4B is optionally and/or selectively configured (e.g. running software and/or firmware stored in memory 412 and/or in storage device 302 and/or in other memories not illustrated, employing application specific circuitry, etc.) to provide dynamically adaptive caching of data sent and received from the host 308. The system 300 may present a logical or effective cache size to the host 308 that exceeds the physical cache size.

Figure 5:
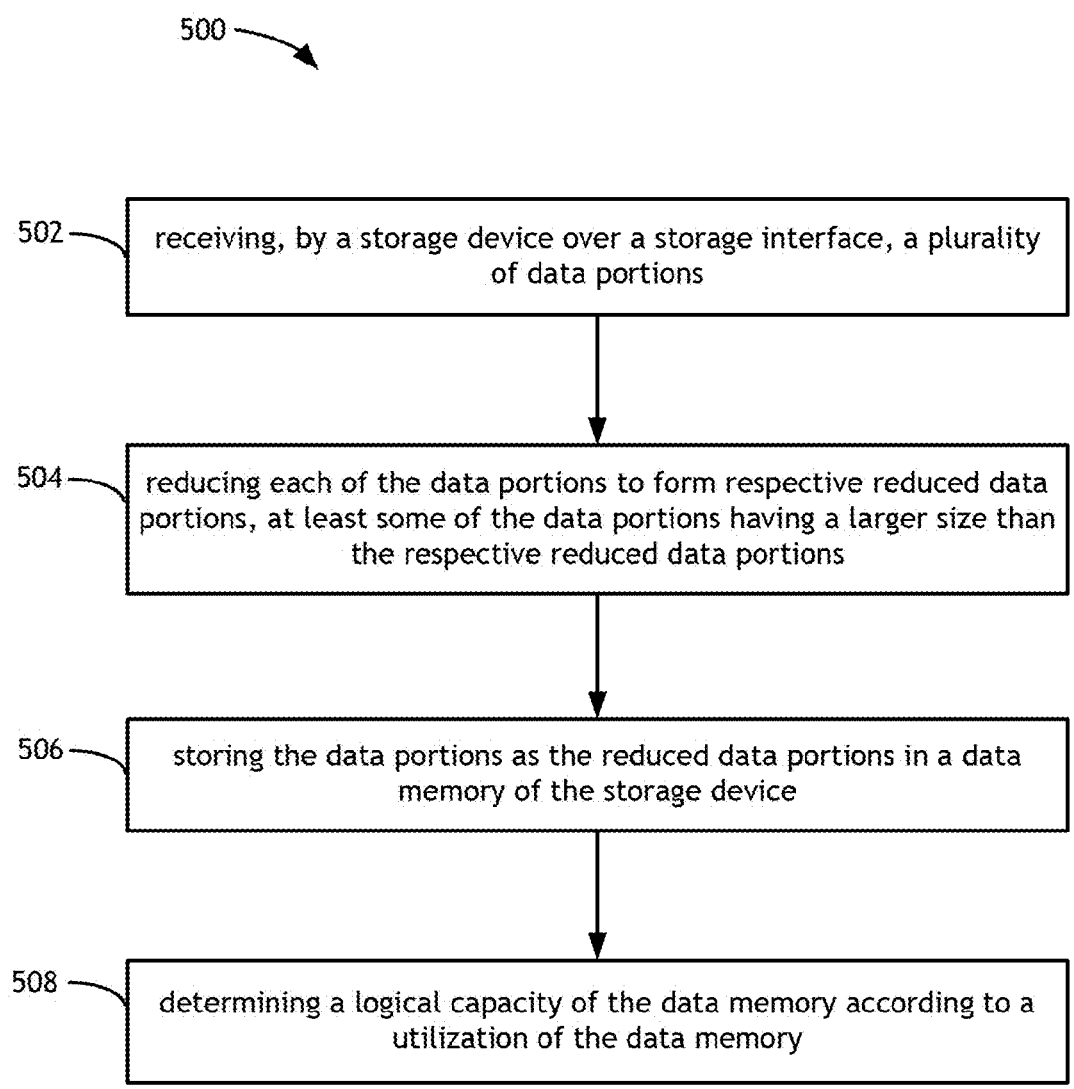
FIG. 5 is a flow diagram of an additional method in accordance with the present disclosure.

The present disclosure is also directed to a method 500 as shown in FIG. 5. The method 500 includes the step of receiving, by a storage device over a storage interface, a plurality of data portions 502. The storage interface may include a SATA interface, a SAS interface, a PCIe interface, or other suitable storage interface. The next step of the method requires reducing each of the data portions to form respective reduced data portions, at least some of the data portions having a larger size than the respective reduced data portions 504. According to various embodiments, one or more data reduction techniques, such as de-duplication and compression, are used. The method also includes the step of storing the data portions as reduced data portions in a data memory of the storage device 506. The data memory may be non-volatile data memory. The final step of the method is to determine a logical capacity of the data memory according to a utilization of the data memory 508.

In the method 500, the logical capacity of the data memory varies according to the utilization of the data memory, such as by being proportional to the utilization, or such as by being a function of the utilization. In turn, the utilization of the data memory varies according to how many data portions are stored in the data memory, and according to the reducing of the stored data portions. In a first example, the utilization of the data memory increases as more data portions are stored into previously unused logical blocks of the data memory. In a second example, the utilization of the data memory decreases as previously stored data portions are over-written with data portions that reduce to a greater extent. In a third example, the utilization of the data memory decreases as stored data portions are removed, such as by trimming them.

In some embodiments of the method 500, the logical capacity has a determined maximum value, such as a provisioned logical capacity. According to various embodiments, the provisioned logical capacity is able to store an amount of the data portions less than, same as, or greater than a physical size of the data memory, assuming the data portions are irreducible. In further embodiments, the provisioned logical capacity, assuming the data portions are irreducible, is able to store an amount of the data portions less than the physical size of the data memory to provide an amount of over-provisioning of the physical size. Over-provisioning improves performance of some storage devices, such as by reducing write amplification.

A usable logical capacity less than or equal to the provisioned logical capacity is determined based, at least in part, on the utilization of the data memory. According to various embodiments, the usable logical capacity is one or more of: increased as the utilization decreases; decreased as the utilization increases; a linear function of the utilization; a nonlinear function of the utilization; changed periodically in time; changed periodically in a number of commands received by the storage device; and changed when the utilization changes by more than a determined amount. Varying the usable logical capacity enables a dynamically adaptive cache storing data in the storage device to advantageously store an amount of data according to the usable logical capacity, and thus to increase performance according to reducibility of data stored therein.

The method 500 shown in FIG. 5 may also include the step of removing one or more of the reduced data portions from the data memory in response to the utilization exceeding a specified threshold. In this step, the specified threshold may maintain a write amplification of the storage device below a specified value. In one embodiment, the step of removing one or more of the reduced data portions from the data memory may be accomplished, at least in part, by invalidating one or more entries of a tag memory of the storage device.

The method 500 shown in FIG. 5 may also include an additional step. If the storage device requests a particular one of the data portions, the method may include the step of reading the respective reduced data portion from the data memory, reversing the reducing of the respective reduced data portion to restore the particular data portion, and returning the particular data portion to the host in response to the request.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a solid-state disk, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art may include progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed is:

1. A method for managing a dynamically adaptive cache including a storage device, comprising the steps of:
receiving data from a host;
compressing the received data to a compressed data;
storing the compressed data;
determining an amount of available space on the storage device;
increasing a logical capacity presented to the host by an amount according to at least a portion of a difference between a size of the received data and a size of the compressed data when the amount of available space on the storage device is greater than a configuration threshold.

2. The method of claim 1, further comprising the step of:
releasing space when the amount of available space is less than a reserve amount.

3. The method of claim 2, further comprising the step of:
signaling when the amount of available space is less than the reserve amount.

4. The method of claim 1, wherein the determining an amount of available space includes:
signaling when the amount of available space is greater than the configuration threshold;
sending a query to determine the amount of available space.

5. The method of claim 1, wherein each step of the method is performed each time data is received from the host.

6. The method of claim 1, wherein the step of compressing the received data to a compressed data includes compressing the data using lossless algorithms.

7. A system for dynamically adaptive caching, comprising:
a storage device, the storage device having a physical capacity for storing data received from a host;
a compression module, the compression module for compressing the data received from the host to a compressed data size;
a control module, the control module configured for receiving data from the host, the control module further configured for determining an amount of available space on the storage device, the control module further configured for determining a reclaimed space, the reclaimed space according to a difference between the size of the data received from the host and the compressed data size;
an interface module, the interface module configured for presenting a logical capacity to the host, the logical capacity having a variable size; the logical capacity including at least a portion of the reclaimed space.

8. The system of claim 7, wherein the control module is further configured for releasing space on the storage device when the amount of available space on the storage device is less than a reserve amount.

9. The system of claim 7, wherein the storage device is a solid-state drive.

10. The system of claim 7, wherein a fixed minimum logical capacity is presented to the host.

11. A method comprising:
receiving, by a storage device over a storage interface, a plurality of data portions;
reducing each of the data portions to form respective reduced data portions, at least some of the data portions having a larger size than the respective reduced data portions;
storing the data portions as the reduced data portions in a data memory of the storage device; and
determining a logical capacity of the data memory according to a utilization of the data memory, wherein the logical capacity of the data memory varies according to the reducing;
wherein the logical capacity increases as a difference between a total size of the data portions and a total size of the reduced data portions increases.

12. The method of claim 11, wherein the logical capacity corresponds to a number of the data portions that the data memory is able to store.

13. The method of claim 11, further comprising:
in response to the utilization exceeding a specified threshold, removing one or more of the reduced data portions from the data memory.

14. The method of claim 13, wherein the removing comprises invalidating one or more entries of a tag memory of the storage device.

15. The method of claim 13, wherein the specified threshold maintains a write amplification of the storage device below a specified value.

16. The method of claim 11, wherein the logical capacity decreases as a difference between a total size of the data portions and a total size of the reduced data portions decreases.

17. The method of claim 11, wherein the storage interface is one of a SATA interface, a SAS interface, and a PCIe interface.

18. The method of claim 11, wherein the data memory is non-volatile.

19. The method of claim 11, wherein the reducing comprises compressing.

20. The method of claim 11, further comprising:
in response to a request to the storage device for a particular one of the data portions, reading the respective reduced data portion from the data memory, reversing the reducing of the respective reduced data portion to restore the particular data portion, and returning the particular data portion to the host.

* * * * *